US008033203B2

(12) United States Patent
Johnson et al.

(10) Patent No.: US 8,033,203 B2
(45) Date of Patent: Oct. 11, 2011

(54) SLITTING KNIFE CARTRIDGE

(75) Inventors: Martin F. Johnson, Humboldt, TN (US); Paul E. Hensley, Jr., Humboldt, TN (US)

(73) Assignee: NCR Corporation, Duluth, GA (US)

( * ) Notice: Subject to any disclaimer, the term of this patent is extended or adjusted under 35 U.S.C. 154(b) by 1575 days.

(21) Appl. No.: 10/883,527

(22) Filed: Jul. 1, 2004

(65) Prior Publication Data

US 2006/0000324 A1 Jan. 5, 2006

(51) Int. Cl.
*B23D 19/06* (2006.01)
*B26D 1/24* (2006.01)

(52) U.S. Cl. ............. 83/345; 83/425.4; 83/481; 83/482; 83/500; 83/503; 83/504; 83/508.3; 83/649; 83/664; 83/678; 83/949

(58) Field of Classification Search ................. 83/425.3, 83/504, 508.3, 563, 481, 482, 345, 495, 498–503, 83/507, 571, 649, 663, 664, 665, 678, 695, 83/937, 949, 425.2, 425.4, 491; 483/19, 483/31
See application file for complete search history.

(56) References Cited

U.S. PATENT DOCUMENTS

| | | | | | |
|---|---|---|---|---|---|
| 1,787,170 | A | * | 12/1930 | Robinson et al. | 83/482 |
| 2,571,201 | A | * | 10/1951 | Clem | 83/482 |
| 2,792,060 | A | | 5/1957 | Burns | |
| 3,422,714 | A | * | 1/1969 | Van Gompel et al. | 83/498 |
| 3,587,374 | A | * | 6/1971 | Stewart et al. | 83/56 |
| 3,606,811 | A | * | 9/1971 | Hallden | 83/305 |
| 3,682,031 | A | | 8/1972 | Degelleke et al. | |
| 3,685,379 | A | | 8/1972 | Frye et al. | |
| 3,892,156 | A | | 7/1975 | Johnstone | |
| 3,944,150 | A | * | 3/1976 | Jennerjahn | 242/525.7 |
| 4,033,217 | A | * | 7/1977 | Flaum et al. | 83/425.4 |
| 4,205,596 | A | * | 6/1980 | Chesnut | 493/370 |
| 4,224,847 | A | * | 9/1980 | Tokuno | 83/74 |
| 4,346,635 | A | | 8/1982 | Krauss et al. | |

(Continued)

FOREIGN PATENT DOCUMENTS

DE 50188 10/1966

(Continued)

OTHER PUBLICATIONS

John Dusenbery Co, Inc., “Model 614, Installation and Operation Manual,” 1976, pp. Cover, Table of Contents, 1-1 to 7.6.

*Primary Examiner* — Clark F. Dexter
(74) *Attorney, Agent, or Firm* — Robert S. Chee; Charles Q. Maney

(57) ABSTRACT

A cartridge is configured for slitting a mill roll in a slitting machine. The cartridge includes a first shaft mounted in bearings in a pair of endplates, with one end of the shaft having a driven yoke for rotation thereof. The first shaft includes a row of first circular blades spaced longitudinally by corresponding first spacers. A second shaft is pivotally mounted in the endplates, and is spaced parallel with the first shaft. A dovetail bar is fixedly joined to the second shaft parallel therewith. And, a row of blade holders are mounted along the dovetail bar, with each holder including a second circular blade aligned with a corresponding one of the first blades for cutting in shear a web unwound from the mill roll. The cartridge may be quickly replaced in the slitting machine for each production run thereof for alignment with cores on a corresponding arbor.

6 Claims, 11 Drawing Sheets

U.S. PATENT DOCUMENTS

| | | | | | |
|---|---|---|---|---|---|
| 4,684,360 | A | * | 8/1987 | Tokuno et al. | 493/367 |
| 4,846,778 | A | * | 7/1989 | Hirakawa et al. | 493/354 |
| 4,899,630 | A | * | 2/1990 | Shioya et al. | 83/425.4 |
| 5,367,934 | A | * | 11/1994 | MacNiel | 83/425.2 |
| 5,779,617 | A | * | 7/1998 | Larkin et al. | 493/475 |
| 5,787,780 | A | * | 8/1998 | Carter | 83/425.4 |
| 5,797,830 | A | * | 8/1998 | Flores et al. | 493/361 |

FOREIGN PATENT DOCUMENTS

| | | |
|---|---|---|
| DE | 1436909 | 4/1969 |
| GB | 2387138 | 10/2003 |

* cited by examiner

SLITTING KNIFE CARTRIDGE

BACKGROUND OF THE INVENTION

The present invention relates generally to paper slitting machines, and, more specifically, to alignment thereof.

The ubiquitous paper roll is found in various sizes for various applications including cash registers, ATM machines, adding machines, and receipt printers. Each roll typically includes a paper or plastic core around which is wound a continuous ribbon of paper.

Paper rolls are typically produced in a slitting machine in which a large mill roll of paper is mounted at one end of the machine, unwound through the machine, and then slit at numerous locations along its width to provide corresponding ribbons which are then wound on corresponding cores commonly mounted on a supporting arbor or mandrel. The slitting operation is effected by a pair of circular knives or blades which slit the web in a typical shear cut for each of the cores.

In a single production run of paper cores, several cores are mounted coaxially around the supporting arbor in longitudinal abutting contact therebetween, and fixedly mounted on the arbor by end fittings or nuts. The arbor is then mounted in the slitting machine.

The slitting blades in the machine are typically arranged in pairs on opposite sides of the paper web with the corresponding cutting or shearing lines thereof being suitably aligned with the respective joints between the cores on the arbor.

In one conventional slitting machine, a row of first circular slitting blades are mounted on a first shaft on one side of the web and driven during operation through an end yoke thereof. The first blades are separated from each other by corresponding precision spacers, and thin shims as required to precisely align the cutting edges of the first blades with the corresponding joints between the cores.

A set of second circular blades are pivotally mounted on a second shaft in the machine to selectively engage or disengage the corresponding first blades. Each of the second blades is conventionally mounted in a supporting holder which may be adjusted in position along a supporting dovetail attached to the second shaft. The individual holders may then be adjusted along the dovetail for properly engaging the second blades with their first blade counterparts to control the precise width of each ribbon slit from the web, and also control the cutting overlap or depth between the pairs of first and second blades.

Since each production run of paper cores requires the set up of the individual cores on the arbor, alignment thereof with the first blades, and corresponding alignment of the second blades with the first blades requires considerable time during the set up and alignment procedure. Since the first and second blade sets are integral parts of the slitting machine itself, and the arbor must be suitably mounted therein, the slitting machine cannot be operated during the set up procedure which correspondingly reduces the throughput of the machine, and therefore affects cost of operation.

Accordingly, it is desired to provide an improved slitting machine in which downtime for set up of each production run may be minimized for maximizing use of the machine.

BRIEF SUMMARY OF THE INVENTION

A cartridge is configured for slitting a mill roll in a slitting machine. The cartridge includes a first shaft mounted in bearings in a pair of endplates, with one end of the shaft having a driven yoke for rotation thereof. The first shaft includes a row of first circular blades spaced longitudinally by corresponding first spacers. A second shaft is pivotally mounted in the endplates, and is spaced parallel with the first shaft. A dovetail bar is fixedly joined to the second shaft parallel therewith. And, a row of blade holders are mounted along the dovetail bar, with each holder including a second circular blade aligned with a corresponding one of the first blades for cutting in shear a web unwound from the mill roll. The cartridge may be quickly replaced in the slitting machine for each production run thereof for alignment with cores on a corresponding arbor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
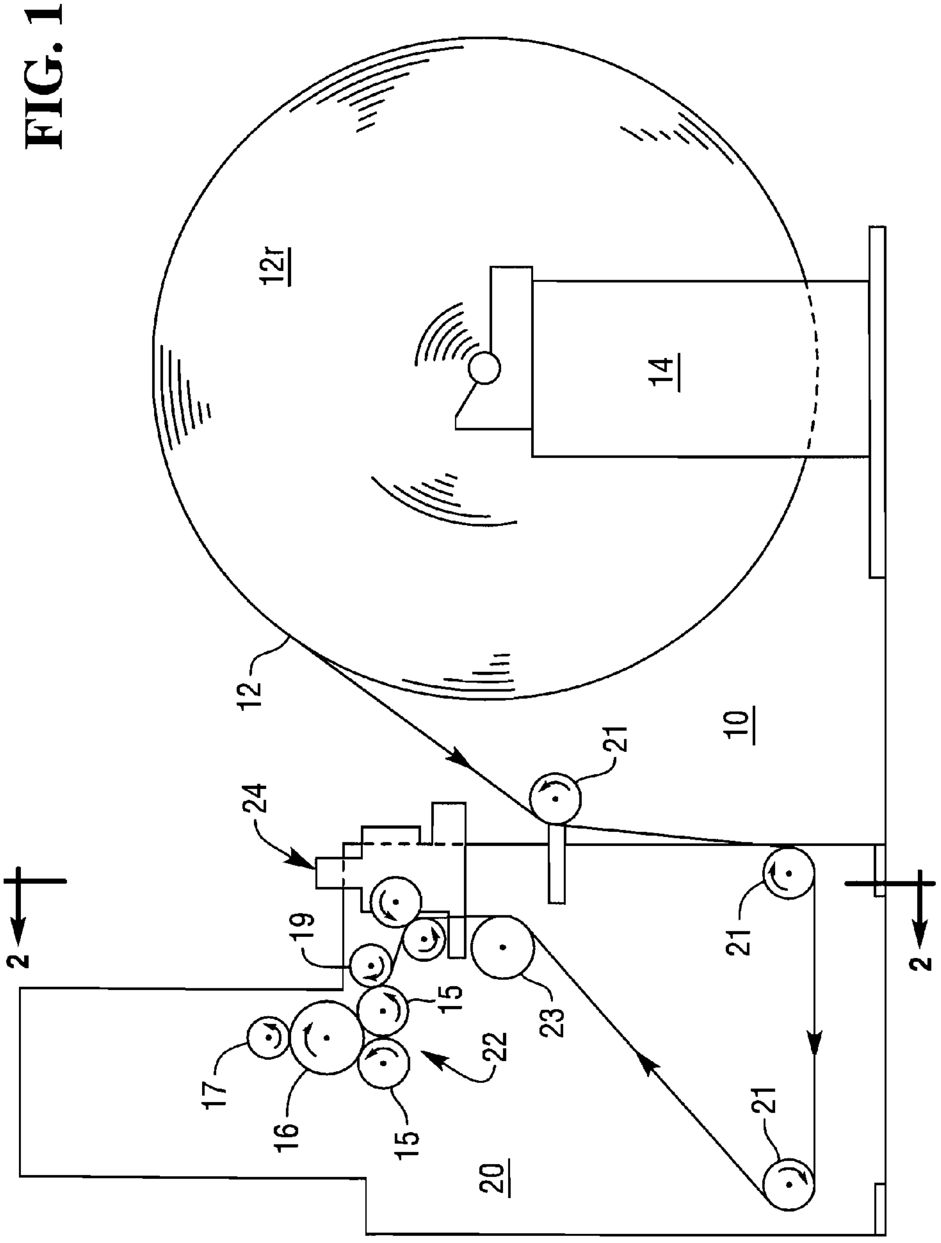
FIG. 1 is a side elevational schematic view of an exemplary slitting machine including a removable slitting knife cartridge therein.
Figure 2:
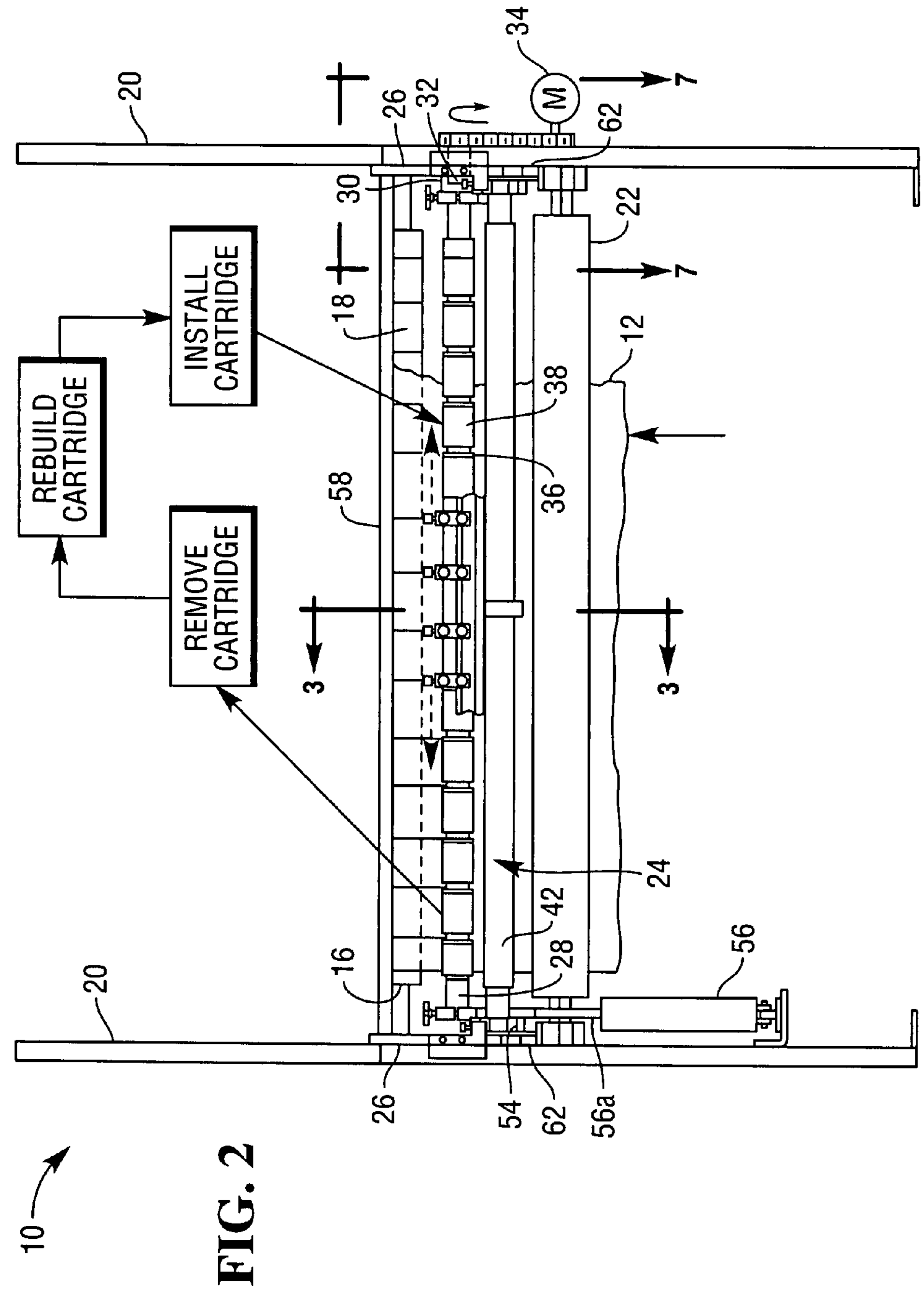
FIG. 2 is an elevational sectional view through the machine of FIG. 1 and taken generally along line 2-2.

Illustrated schematically in FIGS. 1 and 2 is a paper roll slitting machine 10 configured for cutting or slitting into multiple strands or ribbons the web 12 unwound from a mill roll 12*r*. As shown in FIG. 1, the machine includes an unwind stand 14 disposed at one end for rotatably mounting the mill roll 12*r* on a supporting shaft extending through the center thereof. The web is pulled during operation from the roll for unwinding therefrom and is then slit in multiple ribbons along the travel or feed path through the machine.

A mandrel or arbor 16 is suitably rotatably mounted at an opposite end of the machine at the end of the feedpath for the web for winding around a plurality of cores 18 suitably mounted on the arbor as illustrated in FIG. 2. The cores may be plastic or paper, for example, and simply abut each other along the longitudinal length of the arbor and are secured thereon by end clamps or nuts at the opposite ends of the arbor.

The slitting machine illustrated in FIGS. 1 and 2 includes a pair of laterally opposite or spaced apart endwalls 20 and various frame components for providing structural integrity to the machine and mounting the various components thereof. For example, the machine includes various rollers or rolls, generally designated 22, which define the feedpath for the web 12 of the roll as it is unwound from the stand 14 at one end of the machine, slit into multiple ribbons, and then rewound on the corresponding cores supported on the arbor 16.

The arbor 16 rests on a pair of bed rolls 15, with a riding roll 17 resting atop the arbor. A nip roll 19 immediately precedes the two bed rolls 15, and three idler rolls 21 are located upstream in the feedpath to suitably guide the unwinding web from the mill roll into the machine for slitting thereof. A spreader roller 23 immediately follows the last idler roll prior to slitting of the web into the multiple ribbons.

Except for the slitting components of the machine 10 illustrated in FIG. 1, the slitting machine is otherwise conventional, and is suitably modified in accordance with various features of the present invention. For example, the basic slitting machine illustrated in FIGS. 1 and 2 was purchased decades ago from the John Dusenbery Company, Inc., of Clifton, N.J. as Model 614, with this company having since changed its name to Dusenbery Worldwide of Randolph, N.J. The basic slitting machine has been in commercial operation for many years in slitting mill rolls for the production of paper rolls sold in commerce in the U.S. and globally.

The original Model 614 slitting machine includes two rows of circular slitting knives or blades integrally formed in the machine. Alignment of those blades with the cores on the arbor 16 required that the machine be turned off to permit building and alignment of the two sets of slitting blades.

In a previous modification of the slitting machine, one set of the slitting blades was replaced by a set of blade holders and corresponding blades mounted on a dovetail bar which in turn was pivotally mounted in the machine. The introduction of the dovetail bar and blade holders improved the setup process by permitting the individual blade holders to be quickly adjusted in lateral position along the dovetail bar for alignment with the first set of blades. However, alignment of the two sets of blades still requires a substantial amount of time to conduct while the machine remains inoperable.

Accordingly, a yet further modification of this otherwise conventional slitting machine is disclosed hereinbelow to permit quicker setup of the machine between production runs for minimizing the downtime thereof.

More specifically, the slitting machine 10 initially illustrated in FIGS. 1 and 2 is modified to include a slitting knife cartridge 24 which may be quickly mounted therein and dismounted between production runs. As shown schematically in FIG. 2, one cartridge may be quickly removed from the machine while a replacement cartridge is then quickly installed with a minimum amount of downtime required for the machine.

The removed cartridge may then be conveniently rebuilt for another production run later in time. In this way, building and alignment of the slitting knives in an individual cartridge may be performed externally from the slitting machine without requiring downtime therefor, with the machine being turned off solely when required to remove and substitute replacement slitting knife cartridges for corresponding core sizes.

Figure 3:
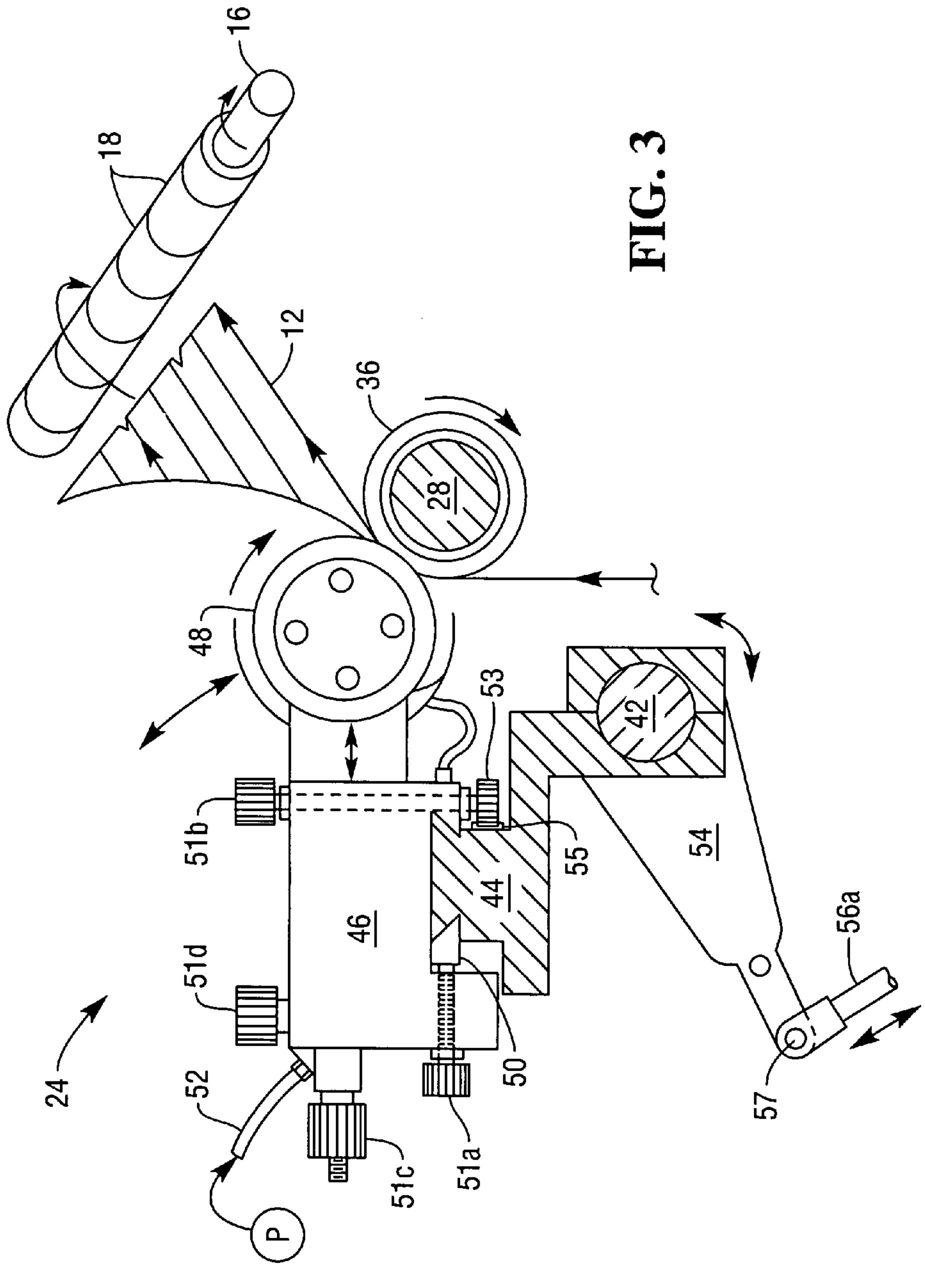
FIG. 3 is a partly sectional side elevational view through the slitting knife cartridge illustrated in FIG. 2 and taken along line 3-3.
Figure 4:
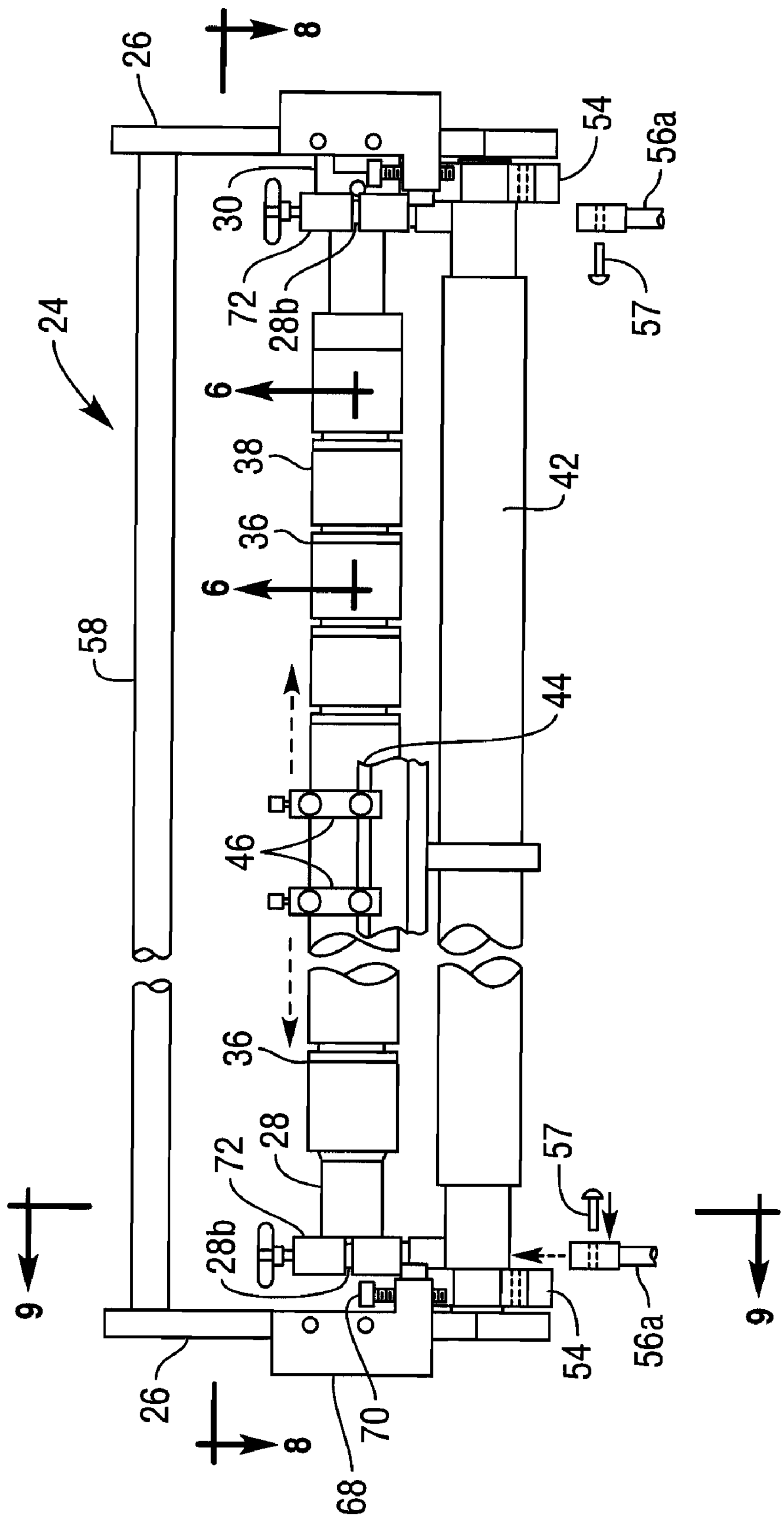
FIG. 4 is an enlarged elevational view of the cartridge illustrated in FIG. 2.

FIG. 3 illustrates in more detail the slitting blades of the cartridge 24, and FIG. 4 illustrates an exemplary form of the cartridge in isolation. As initially shown in FIG. 4, the cartridge 24 includes a pair of left and right endplates 26 spaced laterally apart from each other. A first or inside rotary shaft 28 is mounted in suitable bearings 28*b* at opposite longitudinal ends thereof in respective ones of the two endplates 26. The right end of the first shaft illustrated in FIG. 4 includes a first or driven coupling or yoke 30 for rotating the first shaft during operation.

Figure 5:
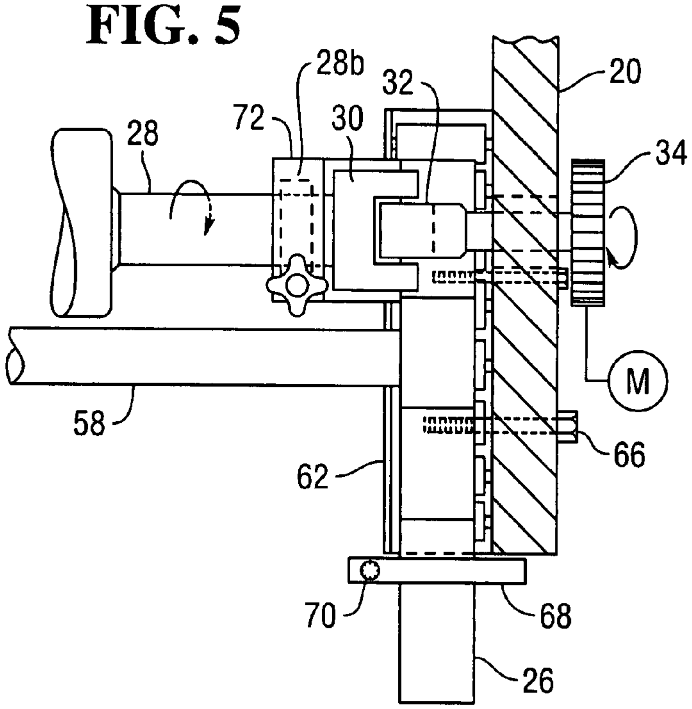
FIG. 5 is a partly sectional top view of a the right endplate of the cartridge illustrated in FIG. 2 and taken along line 5-5.

As shown in FIGS. 2 and 5, the right endwall of the machine includes a complementary second coupling or yoke which engages the first yoke 30 during operation for rotation thereof. A suitable drive train or system 34 includes an electrical motor (M) for rotating the second yoke 32 during operation for in turn rotating the first yoke and shaft during operation in a conventional manner.

Figure 6:
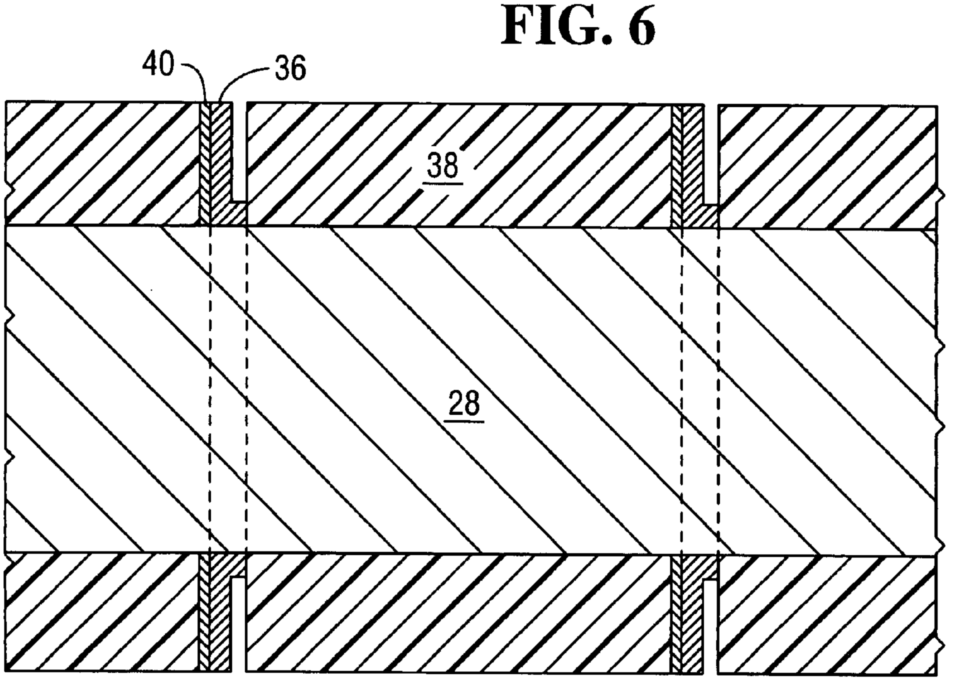
FIG. 6 is an enlarged sectional view through a portion of the first shaft illustrated in FIG. 4 and taken along line 6-6.
Figure 7:
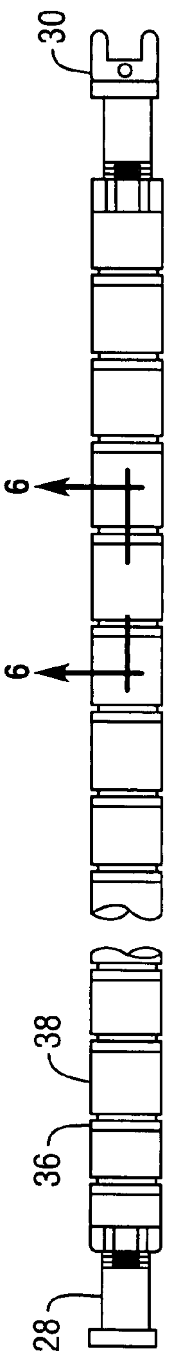
FIG. 7 is a side view of the first shaft in the cartridge illustrated in FIG. 4 in isolation, with a row of first circular blades mounted thereon.

As shown in FIGS. 3 and 4, the first shaft 28 includes a plurality of first circular knives or blades 36 spaced longitudinally apart along the first shaft by corresponding first tubular spacers 38, and thin circular shims 40 of various thickness as required, and is illustrated in more detail in FIG. 6.

A portion of the first shaft 28 is illustrated in isolation in FIG. 6 and is otherwise conventional except for being mounted in the cartridge 24, instead of directly in the slitting machine. As shown in FIG. 6, the spacers 38 and shims 40 are selected to position each of the first blades 36 on the shaft in a precise location aligned with the corresponding ends or junctions between adjacent cores 18 fixedly mounted on the arbor 16 as illustrated in FIG. 2.

The cartridge 24 illustrated in FIGS. 3 and 4 also includes a second shaft 42 pivotally mounted at opposite longitudinal ends thereof in suitable bushings or bearings in respective ones of the two endplates 26. The second shaft is spaced laterally from the first shaft, and is parallel therewith. The second shaft 42 is illustrated in isolation in FIG. 8.

Figure 8:
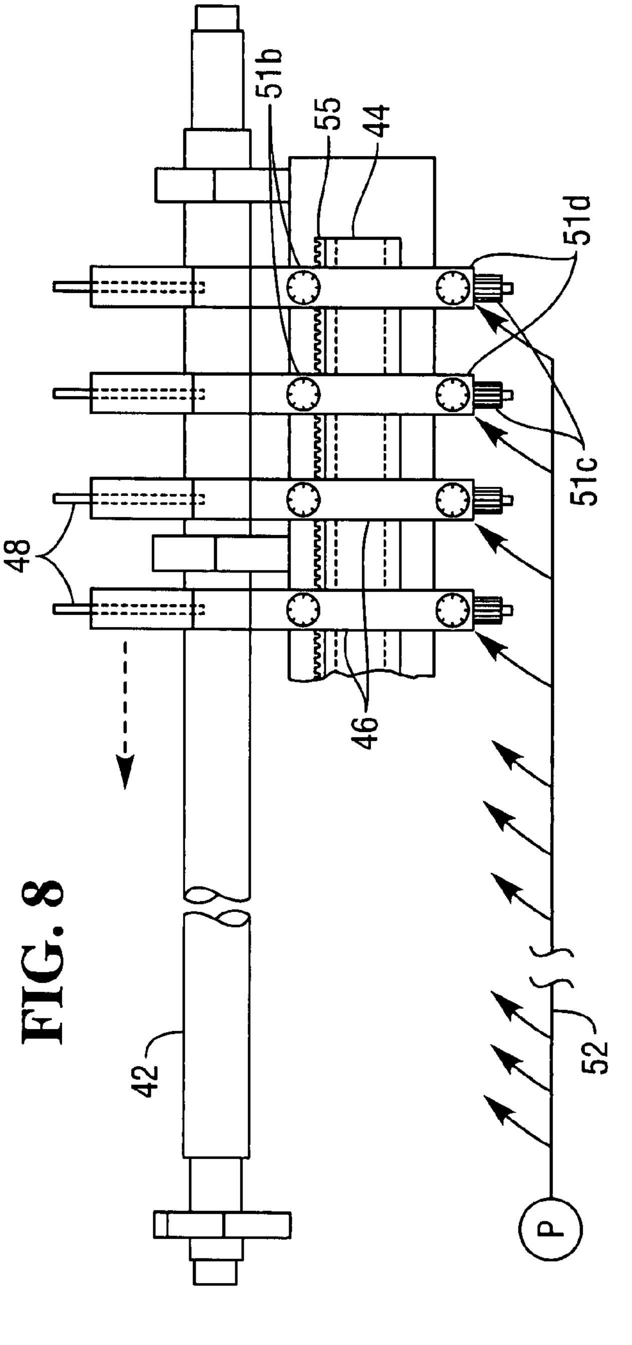
FIG. 8 is a top view of a second shaft in the cartridge illustrated in FIG. 4 having a row of second circular blades and holders therefor mounted thereon.

As shown in FIGS. 3, 4, and 8, an elongate dovetail bar 44 is fixedly joined to the second shaft 42 and parallel therewith for being selectively pivoted during operation. A plurality of blade holders 46 are spaced apart longitudinally along the dovetail bar 44 and releasably clamped thereto.

Each of the blade holders 46 includes a second circular knife or blade 48 suitably mounted at the distal end thereof and aligned with a corresponding one of the first blades 36 for cutting in shear corresponding ribbons from the web 12 unwound from the mill roll 12*r* during operation.

As shown in FIG. 3, each of the blade holders 46 includes an adjustable clamp 50 which may be tightened for fixedly engaging the dovetail bar 44 to lock the position of the blade holders 46 and in turn the supported second blade 48 along the length of the dovetail bar 44, and in turn along the length of the first shaft 28 for alignment with the corresponding first blades 36 supported thereon. The clamp 50 is joined to an adjustment screw 51*a* and is releasable for in turn unlocking the blade holder 46 on the dovetail bar 44 to permit sliding thereof longitudinally along the length of the dovetail bar 44 so that the individual second blades 48 may be accurately aligned with corresponding ones of the first blades 36.

In this regard, each blade holder 46 also includes another adjustment screw 51*b* having a gear 53 at the distal end thereof which engages a gear rack 55 extending along the dovetail bar 44 to permit manual adjustment of the blade holders 46 along the bar 44.

The blade holder 46 illustrated in FIG. 3 is conventional and was commercially purchased from the Tidland Corporation of Camas, Wash. for the previous modification of the conventional slitting machine, with the Tidland blade holders now also being used in the latest modification of the machine 10 to include the new cartridge 24 therein.

As shown in FIGS. 3 and 8, the conventional blade holders 46 are joined to a conventional pressurized air system 52 which is used to selectively extend the blade end of each holder 46 toward the corresponding first blades 36, as well as displacing laterally the second blades 48 in shearing contact with the first blades 36. In this regard, each holder 46 includes another adjustment screw 51*c* which controls the longitudinal extension of the second blades 48 from the holder. And, another screw 51*d* in the holder is used for turning on or off the pressurized air system in each holder. In this way, an excess number of the blade holders 46 may be mounted on the common dovetail bar 44, and only selected ones of those holders may be turned on during operation for engaging the corresponding first blades 36 supported on the first shaft 28.

The various Figures illustrate a sample number of the blade holders 46 and supported second blades 48 thereon, with any suitable number thereof being mounted on the dovetail bar 44. For example, twenty-two blade holders 46 with twenty-two corresponding second blades 48 may be mounted on the dovetail bar to correspond with twenty-two first blades 36 mounted on the first shaft 28 for slitting the common web 12 into twenty-one ribbons for winding upon twenty-one cores 18 supported on the arbor 16.

As illustrated in FIGS. 2 and 3, the second shaft 42 preferably includes a pair of levers or cranks 54 fixedly joined to opposite ends thereof for pivoting the second shaft 42, and in turn pivoting the dovetail bar 44 and blade holders 46 mounted thereon to selectively engage and disengage the second blades 48 with the first blades 36 during operation of the slitting machine 10. Each crank 54 is joined by a connecting pin 57 to the distal end of the rod 56*a* extending from a suitable pneumatic or hydraulic actuator 56 for selectively pivoting the second shaft 42, dovetail bar 44, and blade holders 46 mounted thereto when required.

For example, the crank 54 is illustrated in FIG. 3 rotated clockwise to engage the second blades 48 with their counterpart first blades 36 during the slitting operation of the web 12. When the slitting operation is interrupted, the actuator is powered to retract its output rod and pivot the cranks 54 counterclockwise in FIG. 3 to space the second blades 48 away from the first blades 36 and provide access to the web located therebetween.

As indicated above, the first shaft 28 and the first blades 36 thereon, as well as the second shaft 42, dovetail bar 44, blade holders 46, and second blades 48 are conventional in configuration and operation and were previously used in commercial operation in the United States for many years, however, without the cartridge configuration of the present invention, but instead integrally mounted in the basic slitting machine. That machine is modified in accordance with the present invention to introduce the cartridge 24 with suitable modifications of the first and second shafts in combination therewith for allowing quick and easy mounting and removal of the cartridge in the correspondingly modified slitting machine.

In particular, the second shaft 42 illustrated in FIG. 4 is pivotally mounted directly in the two endplates 26 instead of being mounted directly to the two endwalls 20 of the slitting machine. Correspondingly, the first shaft 28 is mounted in bearings in the cartridge, with the conventional first yoke 30 being accessible for simple engagement with the second yoke 32 mounted in the machine. In this way, the cartridge contains both the first and second shafts and may be readily installed and removed from the machine with a minimum amount of interconnections therewith, and with minimal time for cartridge replacement.

As illustrated in FIG. 4, the first and second shafts 28,42 structurally join together the two endplates 26 of the cartridge, and the cartridge preferably also includes a tie bar 58 fixedly joined at opposite longitudinal ends thereof to the top portions of the two endplates 26. In this way, the tie bar 58 provides with the first and second shafts 28,42 three separate and parallel load paths between the two endplates for maintaining structural integrity of the cartridge and permitting its installation and removal without changing the alignment of the two sets of slitting blades therein.

Figure 9:
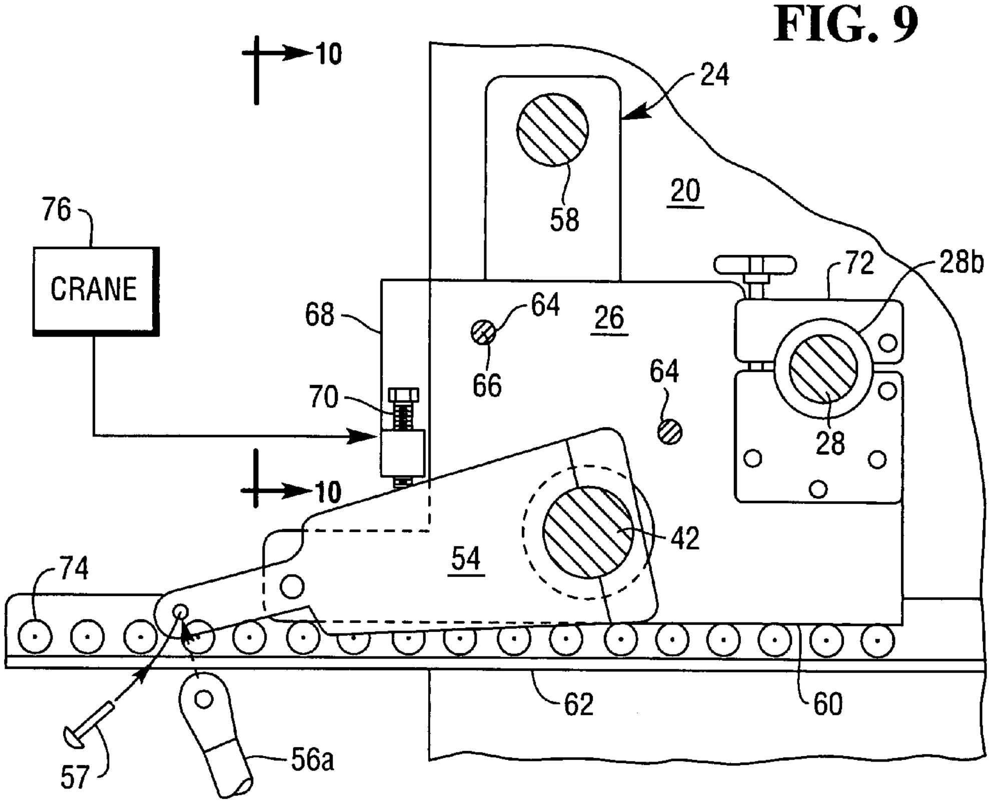
FIG. 9 is an enlarged elevational sectional view through the cartridge illustrated in FIG. 4 and taken along line 9-9.

As shown in FIG. 9, the two endplates 26 are generally flat plates and include straight bottom edges defining rails 60 spaced longitudinally apart from each other as illustrated in FIG. 2.

The two endplates 26 and their bottom rails 60 are sized for resting atop a complementary seat 62 defined between the two endwalls 20 in the slitting machine. As shown in FIG. 5, when the endplates 26 are resting atop the seat 62 closely adjacent to the corresponding endwalls 20, the first yoke 30 may be positioned to engage the complementary second yoke 32 extending through the right endwall 20.

The yokes 30,32 are in the conventional form of U-shaped members which permit initial engagement thereof by sliding the first yoke 30 over the second yoke 32 until the two shafts thereof are coaxially aligned. In this position, rotation of the second yoke 32 circumferentially engages the forks of the first yoke 30 for in turn driving the first shaft 28 during operation.

Since the cartridge is removable, the two endplates thereof as illustrated in FIGS. 5 and 9 preferably include a pair of threaded retention holes 64 aligned with corresponding retention holes in the two endwalls 20 of the machine for receiving retention bolts 66 therethrough. In this way, when the cartridge is installed in its seat in the machine, two bolts 66 on each side of the cartridge may be inserted for retaining in proper alignment the cartridge in the machine.

Figure 10:
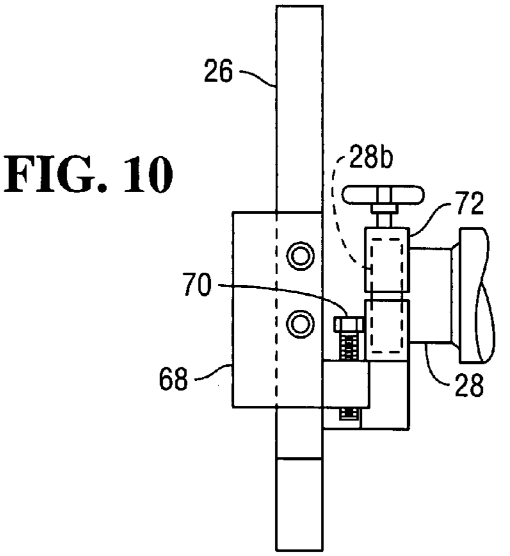
FIG. 10 is an elevational end view of a portion of the left endplate illustrated in FIG. 9 and taken along line 10-10.

As illustrated in FIGS. 5, 9, and 10 each of the endplates 26 preferably also includes a stop flange 68 extending laterally outwardly therefrom for abutting the corresponding endwall 20 of the machine to limit horizontal insertion of the cartridge into the seat.

The stop flange provides a convenient location for introducing a vertically adjustable set screw 70 as shown in FIGS. 9 and 10 positioned to engage the crank 54 for adjusting its pivoted position, and correspondingly adjusting the depth or overlap of the second blades 48 relative to the first blades 36 as illustrated in FIG. 3.

FIGS. 4, 9, and 10 also illustrate the introduction of a pair of bearing holders or clamps 72 fixedly mounted to respective ones of the two endplates 26 and spaced inboard therefrom. The bearing clamp 72 may be formed in two vertical halves with a set screw or handle for clamping the upper pivoted half to the lower half and trapping the shaft bearings 28*b* therein. In this way, the two end bearings of the first shaft 28 are fixedly mounted in the bearing clamps 72, with the first yoke 30 as illustrated in FIG. 5 being positioned between the endplate 26 and the clamp 72 at one end of the first shaft to provide unobstructed access to the second yoke 32 when the cartridge is installed in the machine.

As illustrated in FIGS. 5 and 9 the opposite endplates 26 of the cartridge have identical bottom rails 60 which rest atop corresponding portions of the seat 62 formed in the machine. The first and second yokes 30,32 as illustrated in FIG. 5 are readily engaged during the installation process. And, as shown in FIG. 9 the output rod 56*a* of the actuator 56 may simply be joined to the distal end of the crank 54 using a suitable mounting pin 57 therefor.

The two cranks 54 may then be pivoted by the corresponding two actuators 56 at opposite ends of the second shaft 42 for engaging the row of second blades 48 with the counterpart first blades 36 as illustrated in FIG. 3. The first shaft 28 may then be driven during operation for slitting the paper web 12 therebetween for winding around the corresponding cores supported on the arbor.

The modification of the slitting machine illustrated in FIG. 2 to include the removable cartridge 24 enjoys many advantages, including reducing the downtime required for the slitting machine between production runs. The cartridge configuration permits pre-building of the individual cartridge remote from the machine, which machine may continue to operate for a specific production run. Upon completion of one production run, the cartridge therein may be quickly removed and replaced by another cartridge specifically configured for another production run and the corresponding set of cores on another arbor.

In order to improve the ease of cartridge replacement, the seat 62 illustrated in FIG. 9 preferably includes a pair of bearing tracks 74, each of which is a horizontal series of roller bearings for supporting corresponding ones of the endplate rails 60. In this way, a suitable hoist or crane 76 may be used to install the entire cartridge 24 with its several components which cannot be conveniently lifted by one or two operators. The heavy cartridge may be lowered by crane atop the bearing track 74 which extends suitably outwardly from the two endwalls 20. The cartridge may then rest on the bearing tracks and be easily pushed into final position in the mounting seat 62.

Figure 11:
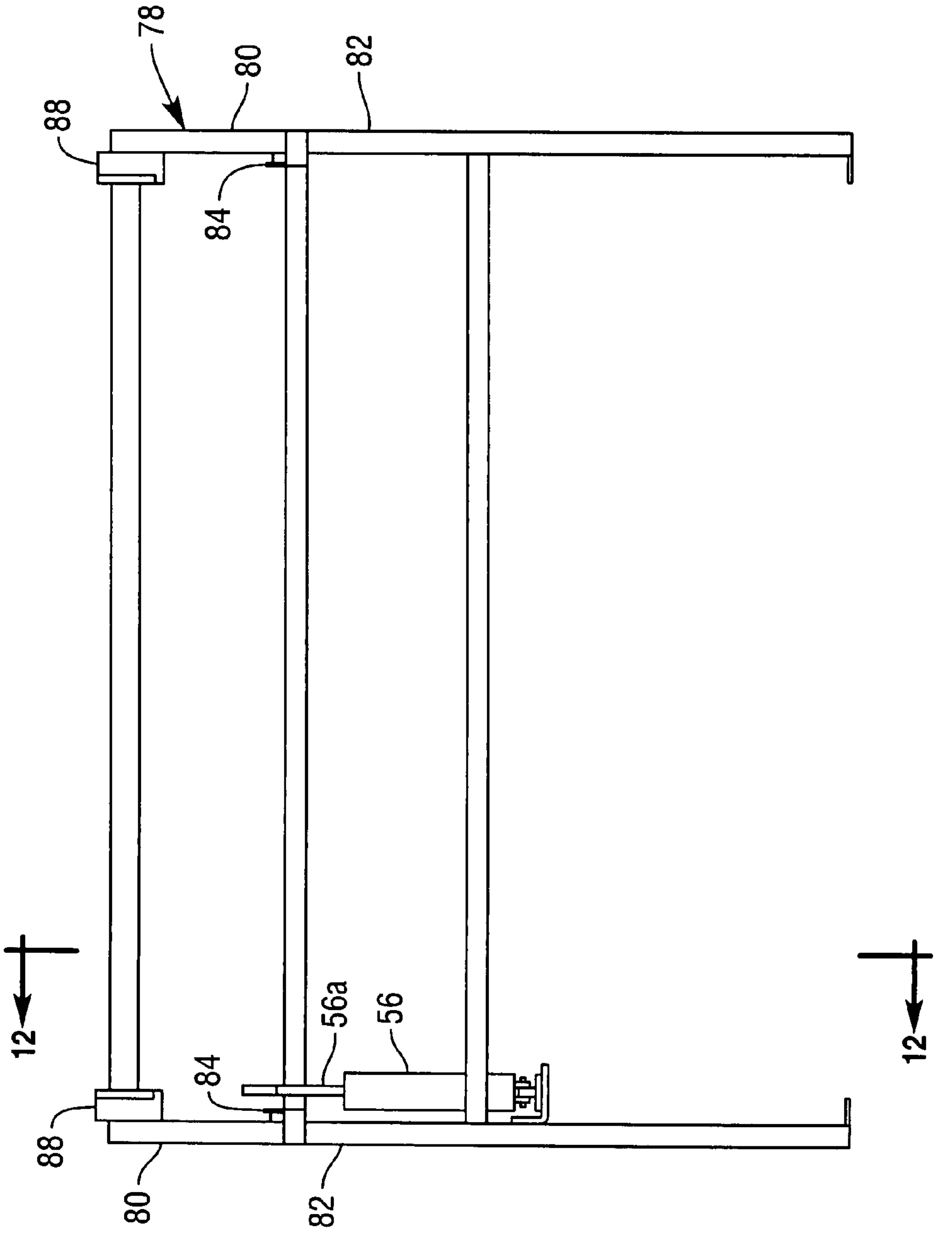
FIG. 11 is an elevational view of a setup table for receiving the cartridge illustrated in FIG. 4.
Figure 12:
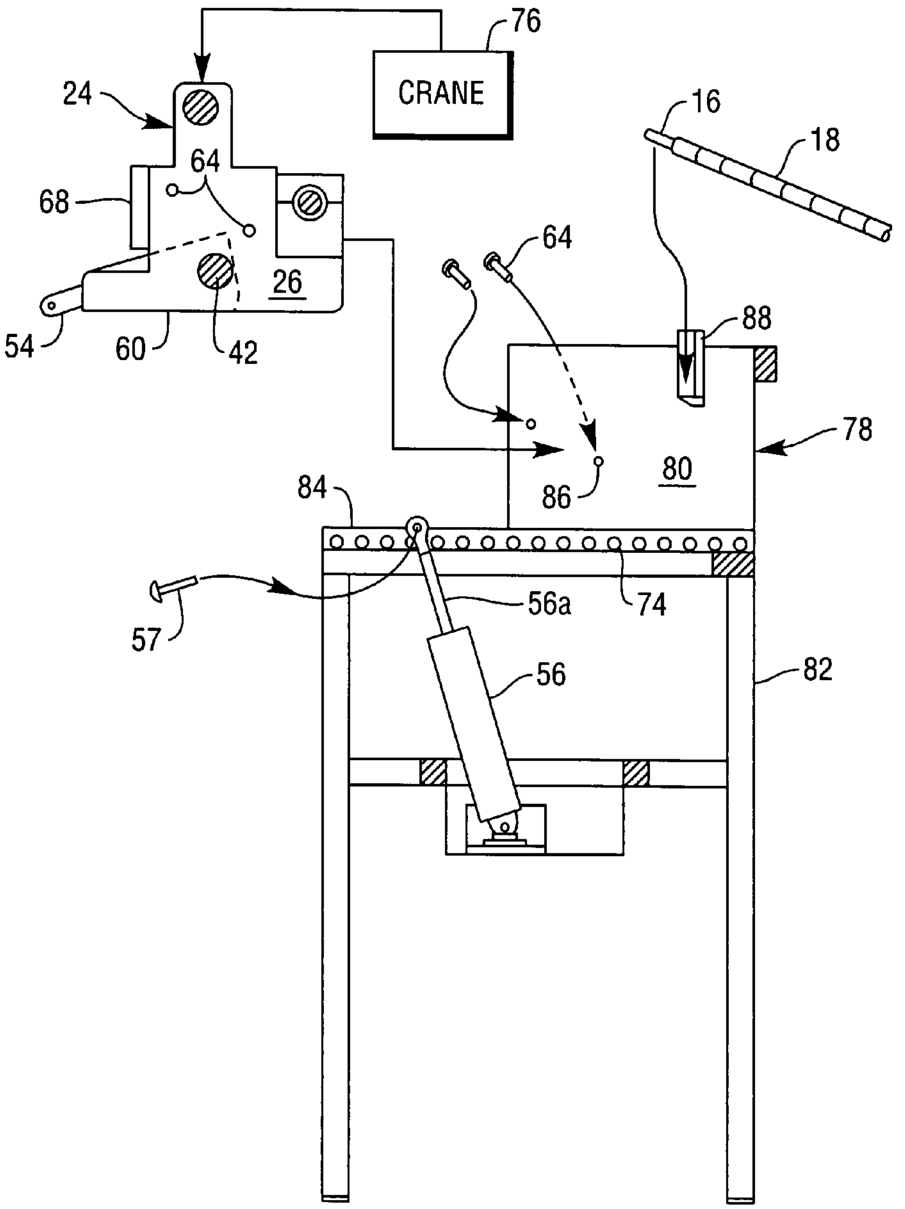
FIG. 12 is an elevational sectional view through the table illustrated in FIG. 11 and taken along line 12-12.

The cartridge form of the two sets of slitting blades permits their convenient alignment remote from the operating slitting machine in a setup table 78 specifically configured therefor as initially illustrated in FIGS. 11 and 12. The setup table 78 includes a pair of spaced apart endwalls 80 joined together by an integral frame 82 having suitable legs and cross bridges extending laterally between the two endwalls. The table includes a seat 84 generally matching the seat 62 of the machine, and similarly includes a pair of the bearing tracks 74 spaced laterally apart for engaging corresponding ones of the rails 60 of the cartridge.

The table endwalls 80 as illustrated in FIG. 12 include a pair of retention holes 86 which may be aligned with corresponding ones of the retention holes 64 in the cartridge endplates 26. The aligned retention holes receive the locking bolts 64 therethrough for fixing the cartridge in position in the setup table. The stop flanges 68 of the cartridge may be used in a similar fashion for limiting insertion of the cartridge along the table seat 84 in the same manner as used in the slitting machine.

The table endwalls 80 include at the top thereof a pair of slots or hooks 88 for supporting the opposite ends of the arbor 16 in the same alignment with the cartridge as found in the slitting machine itself. The arbor 16 illustrated in FIG. 12 includes the row of abutting cores 18 supported thereon and permits the two sets of blades to be aligned therewith outside the slitting machine.

The endwalls 80 and seat 84 of the table 78 correspond with substantially identical endwalls 20 and seat 62 in the slitting machine 10 illustrated in FIG. 2 in the relevant vicinity of the cartridge 24 for similarly mounting the cartridge therein. Correspondingly, the two hooks 88 in the table illustrated in FIG. 12 are specifically mounted for supporting the arbor 16 in the same position relative to the cartridge as also found in the slitting machine itself. In this way, alignment of the blades in the cartridge in the setup table relative to the cooperating arbor and cores 18 thereon will pre-align these components for use when installed in the actual slitting machine.

The setup table illustrated in FIGS. 11 and 12 also includes a single actuator 56 substantially identical with the two used in the slitting machine, with an output rod **56*a* which can be similarly joined to the crank 54 of the second shaft for selectively pivoting the second shaft, dovetail bar, and blade holders mounted thereto in the same manner as found in the slitting machine. It is noted that a single actuator 56 is used in the setup table for convenience, whereas a pair of the actuators 56** would be used in the slitting machine for pivoting opposite ends of the second shaft in typical production runs.

Figure 13:
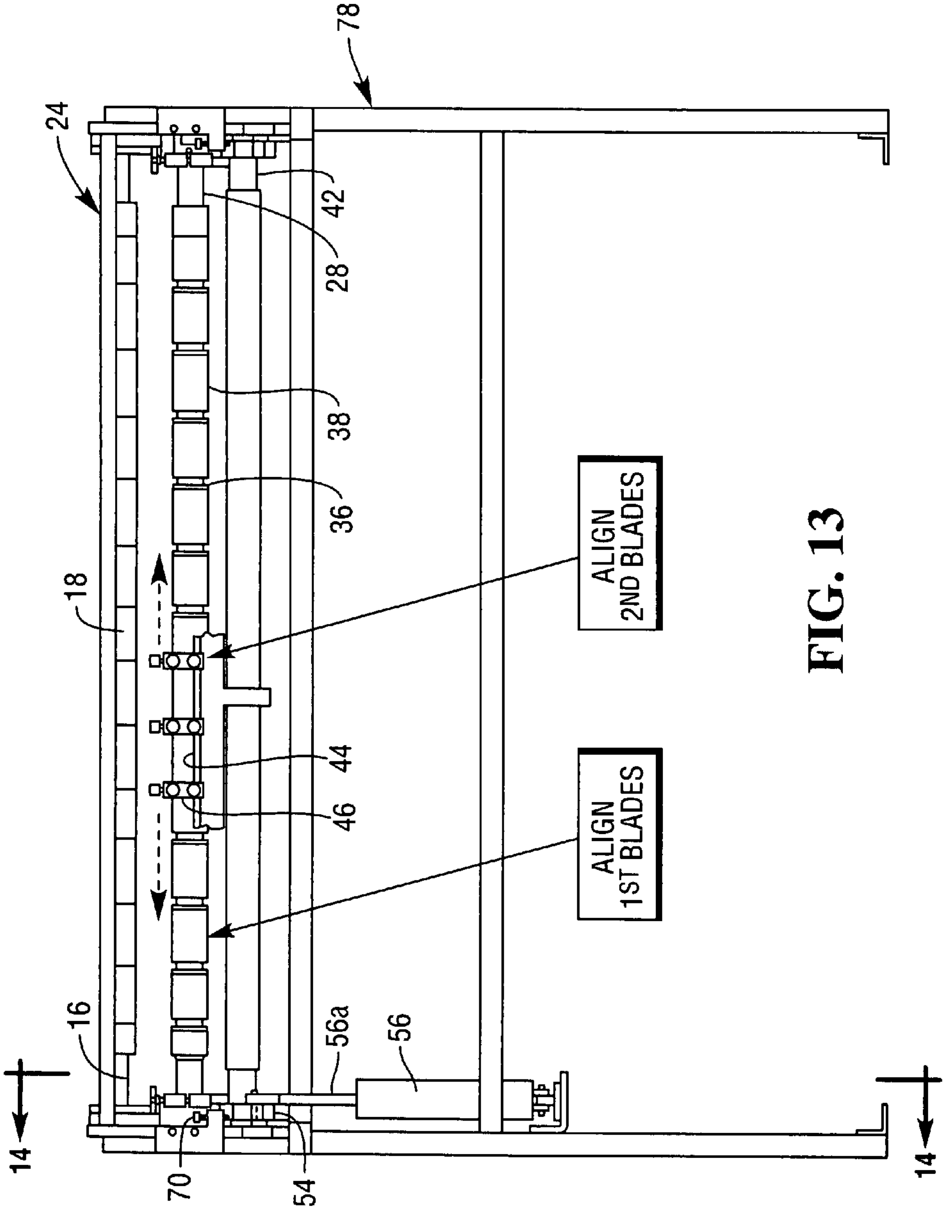
FIG. 13 is an elevational view, like FIG. 11, of the table having the cartridge mounted therein for alignment of the two sets of blades with an arbor also mounted on the table.
Figure 14:
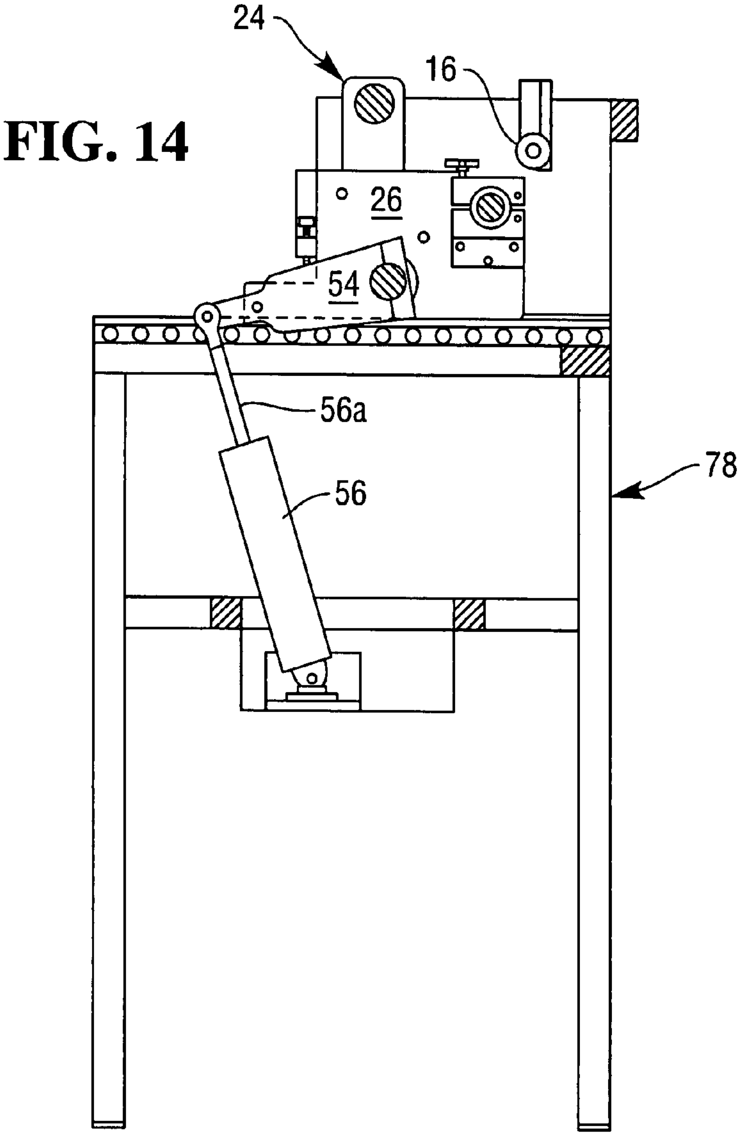
FIG. 14 is an elevational sectional view through the table and cartridge mounted therein in FIG. 13 and taken along line 14-14.

FIGS. 13 and 14 illustrate the cartridge 24 mounted in the setup table 78, along with the corresponding arbor 16 and cores 18 thereon. Once so mounted, the first blades 36 may be aligned with corresponding ends or junctions of the cores 18 mounted on the arbor. This may be done in the same manner as previously used in the slitting machine. For example, the first shaft 28 is readily removable from the cartridge so that a suitable number of the first blades 36 may be mounted thereon with corresponding spacers 38 inserted therebetween, with suitable shims as required for accurately positioning the first blades 36 with the junctions aligned with the corresponding cores 18.

The second blades 48 mounted at the distal ends of the corresponding blade holders 46 may then be conventionally aligned with the corresponding first blades 36. Each blade holder 46 may be conveniently adjusted along the length of the dovetail bar 44 for accurately adjusting the width of the ribbon cuts conforming with the first blades. And, the depth of cut or overlap between the two sets of blades may be conveniently adjusted by the set screw 70 limiting travel of the crank 54 as pivoted by the actuator 56.

Accordingly, the two sets of cutting blades contained in the cartridge 24 may be conveniently assembled and aligned relative to the intended arbor 16 and cores 18 thereon in the setup table remote from the slitting machine, which may continue to operate for a specific production run. For the next production run, the machine may be turned off, the cartridge therein removed along with the corresponding arbor. The pre-built and aligned cartridge 24 from the setup table may be removed from the table along with the corresponding arbor 16, and both installed in the slitting machine to replace the cartridge and arbor previously removed. The distal ends of the actuators 56 in the machine are temporarily disconnected from one cartridge and then reconnected to the next cartridge, and then the machine is again operated in its normal manner, with a minimum loss in downtime as the cartridges are replaced.

In this way, the slitting machine 10 may be operated with a first cartridge 24 as illustrated in FIG. 2 and the corresponding arbor 16 for slitting the web 12 and winding respective web ribbons around the row of cores 18. Upon completion of the slitting and winding operation, the first cartridge and arbor are removed from the machine. And then a different second cartridge and different second arbor are installed in the same machine for the next production run. The machine is then operated with the second arbor and separate cartridge installed therein for again slitting the web and winding respective web ribbons around the new set of cores.

By the relatively simple modification of the basic slitting machine to remount the first and second shafts 28,42 in modified configurations in the removable cartridge 24, significant advantages are obtained. Minimal downtime is now required between production runs in the slitting machine corresponding simply with the removal of one cartridge and replacement thereof with another cartridge and its corresponding arbor and cores upon which are wound the ribbons from the slit paper web.

Safety of operation is also improved because pre-alignment of the blade sets in the cartridge may now be conducted remotely from the tight quarters of the slitting machine around the readily accessible setup table specifically configured therefor. Cranes may be conveniently used for lifting the heavy components of the cartridge, as well as the entire cartridge when required.

Since downtime is substantially reduced using the cartridge method of operation of the slitting machine, smaller production runs may now be economically effected, and a reduction in inventory of wound paper rolls may be achieved. The slitting machine may be more efficiently operated by changing cartridges for specific production runs as desired without a significant loss in downtime of the machine attributed to cartridge replacement.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

We claim:

1. A cartridge for slitting a mill roll for use in a slitting machine, the cartridge comprising:

a pair of endplates spaced laterally apart;

a first shaft mounted in bearings at opposite ends to respective ones of said endplates, with one end having a first yoke that is drivable for rotating said first shaft;

said first shaft including a plurality of first circular blades spaced apart longitudinally along said first shaft by corresponding spacers;

a second shaft pivotally mounted at opposite ends to respective ones of said endplates, and spaced parallel with said first shaft;

a dovetail bar fixedly joined to said second shaft and parallel therewith;

a plurality of blade holders spaced longitudinally apart along said dovetail bar, and each of said holders including a second circular blade aligned with a corresponding one of said first blades for cutting in shear a web unwound from said mill roll; and a pair of bearing clamps fixedly mounted to respective ones of said endplates and spaced inboard therefrom, and said bearings of said first shaft are fixedly mounted in said bearing clamps, with said first yoke being positioned between the endplate and the bearing clamp at one end of said first shaft.

2. A cartridge for slitting a mill roll for use in a slitting machine, in combination with said slitting machine, said slitting machine having a complementary seat defined between laterally opposite endwalls, said cartridge comprising:

a pair of endplates spaced laterally apart;

a first shaft mounted in bearings at opposite ends to respective ones of said endplates, with one end having a first yoke that is drivable for rotating said first shaft;

said first shaft including a plurality of first circular blades spaced apart longitudinally along said first shaft by corresponding spacers;

a second shaft pivotally mounted at opposite ends to respective ones of said endplates, and spaced parallel with said first shaft;

a dovetail bar fixedly joined to said second shaft and parallel therewith;

a plurality of blade holders spaced longitudinally apart along said dovetail bar, and each of said holders including a second circular blade aligned with a corresponding one of said first blades for cutting in shear a web unwound from said mill roll;

said endplates being sized and joined together by said first and second shafts for permitting installation and removal of said cartridge as an assembly in and out of said seat in said machine; and a tie bar fixedly joined at opposite ends to said endplates for providing with said first and second shafts three parallel load paths between said endplates;

wherein:

said endplates include straight bottom rails spaced longitudinally apart with said rails resting atop said seat in said slitting machine, and with said first yoke being engaged with a complementary second yoke in said machine for driving said first yoke and rotating said first shaft, said second shaft includes a crank at one end thereof for pivoting said second shaft, and in turn pivoting said dovetail bar and blade holders to selectively engage and disengage said second blades with said first blades, each of said blade holders further includes a clamp fixedly engaging said dovetail bar, and said clamp is releasable for sliding said blade holders longitudinally along said dovetail bar for aligning said second blades with corresponding ones of said first blades, and said spacers are tubular;

said machine further comprising an actuator joined to said crank for selectively pivoting said second shaft, dovetail bar, and blade holders mounted thereto.

3. An apparatus according to claim 2 further comprising;

a stand disposed at one end of said machine for mounting said mill roll thereatop for unwinding said web therefrom; and an arbor mounted at an opposite end of said machine for winding, around a plurality of cores supported thereon, corresponding ribbons of said web slit by said first and second blades.

4. An apparatus according to claim 3 wherein said arbor is removably mounted to said laterally opposite endwalls of said machine, and said cartridge is removably mounted on said seat between said endwalls.

5. An apparatus according to claim 4 wherein said seat includes a pair of bearing tracks supporting corresponding ones of said rails.

6. An apparatus according to claim 5 wherein each of said endplates further comprises:

a stop flange extending laterally outwardly therefrom for abutting a corresponding endwall of said machine to limit insertion of said cartridge into said seat; and an adjustable screw positioned to engage said crank for adjusting depth of said second blades relative to corresponding ones of said first blades.

* * * * *